US012380718B2

United States Patent
Kha et al.

(10) Patent No.: US 12,380,718 B2
(45) Date of Patent: Aug. 5, 2025

(54) MODEL GENERATION SYSTEM AND MODEL GENERATION METHOD

(71) Applicant: Hitachi, Ltd., Tokyo (JP)

(72) Inventors: Nguyen Cong Kha, Tokyo (JP); Ryosuke Odate, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 18/111,254

(22) Filed: Feb. 17, 2023

(65) Prior Publication Data
US 2023/0306769 A1  Sep. 28, 2023

(30) Foreign Application Priority Data
Mar. 22, 2022 (JP) .................... 2022-045991

(51) Int. Cl.
G06V 30/10 (2022.01)
G06V 30/18 (2022.01)
G06V 30/19 (2022.01)
G06V 30/262 (2022.01)

(52) U.S. Cl.
CPC ........ G06V 30/19147 (2022.01); G06V 30/18 (2022.01); G06V 30/19133 (2022.01); G06V 30/262 (2022.01)

(58) Field of Classification Search
CPC ............................................ G06V 30/10–387
See application file for complete search history.

(56) References Cited

U.S. PATENT DOCUMENTS

2021/0248744 A1* 8/2021 Rijken ................... A61B 6/467
2023/0306769 A1* 9/2023 Kha ........................ G06V 10/82

OTHER PUBLICATIONS

Chen-Yu Lee et al Recursive Recurrent Nets with Attention Modeling for OCR in the Wild arXiv Mar. 2016 (Year: 2016).*
Liu et al., "Online and offline handwritten Chinese character recognition: Benchmarking on new databases," Pattern Recognition, 2013, pp. 155-162, vol. 46, No. 1 (eight (8) pages).

(Continued)

*Primary Examiner* — Sean T Motsinger
(74) *Attorney, Agent, or Firm* — Crowell & Moring LLP

(57) ABSTRACT

Provided is a model generation system for generating a text line recognition model that recognizes a text line included in a text line image, the model generation system including a processor section, in which the text line recognition model includes a visual feature extractor and a language context relation network, the processor section determines a variable of the language context relation network by acquiring text data for training and thus training the language context relation network by using the acquired text data, determines a variable of the visual feature extractor by training the text line recognition model through the use of a labeled text line image while the variable of the language context relation network is fixed, and generates the text line recognition model while the variable of the language context relation network is set to the determined variable thereof and the variable of the visual feature extractor is set to the determined variable thereof.

9 Claims, 8 Drawing Sheets

(56) References Cited

OTHER PUBLICATIONS

Shi et al., "An End-to-End Trainable Neural Network for Image-based Sequence Recognition and Its Application to Scene Text Recognition," IEEE transactions on pattern analysis and machine intelligence, 2016, pp. 2298-2304, vol. 39, No. 11 (nine (9) pages).
Kang et al., "Convolve, Attend and Spell: An Attention-based Sequence-to-Sequence Model for Handwritten Word Recognition," German Conference on Pattern Recognition, 2018, pp. 459-472 (14 pages).
Lee et al., "On Recognizing Texts of Arbitrary Shapes with 2D Self-Attention," Proceedings of the IEEE/CVF Conference on Computer Vision and Pattern Recognition Workshops, 2020, pp. 546-547 (10 pages).
Wang et al., "Deep Visual Domain Adaptation: A Survey," Neurocomputing, 2018, pp. 135-153, vol. 312 (20 pages).
Zhang et al., "Sequence-to-Sequence Domain Adaptation Network for Robust Text Image Recognition," Proceedings of the IEEE Conference on Computer Vision and Pattern Recognition, 2019, pp. 2740-2749 (10 pages).

\* cited by examiner

MODEL GENERATION SYSTEM AND MODEL GENERATION METHOD

BACKGROUND OF THE INVENTION

1. Field of the Invention

The present invention relates to a technology for recognizing text in a text line image.

2. Description of the Related Art

Document recognition provides many benefits to various fields such as retail selling, finance, education, logistics, and health care. Document recognition usually begins by detecting a text line and proceeds to recognize the text line. The text line may be in a number of different styles. For example, the text line may be handwritten, provided with a complicated background, or written in various fonts. Therefore, characters in the text line image are not easily recognized by current technologies.

For the past decades, researches on text line recognition have been mostly focused on a method for dividing a character string into individual characters and individually recognizing the individual characters as described in LIU, Cheng-Lin, et al. "Online and offline handwritten Chinese character recognition: benchmarking on new databases." Pattern Recognition, 2013, 46.1: 155-162. This method divides the text line into character patterns by using a projection profile (projection histogram) and by using many heuristic hypotheses. The resulting character patterns are recognized by using a feature matching model, and a recognition candidate is combined with a language context model by using a lattice diagram. An optimal diagram path is searched for, and the result of the search is outputted as a recognition result.

In recent years, approaches to text line recognition have mostly transitioned to segmentation-free methods based on a convolutional neural network (CNN) and a recurrent neural network (RNN) along with a rapid progress of deep learning. These methods are superior to the above-mentioned method based on the heuristic hypotheses. First of all, as described in Shi, Baoguang, Xiang Bai, and Cong Yao (2016), "An end-to-end trainable neural network for image-based sequence recognition and its application to scene text recognition," IEEE transactions on pattern analysis and machine intelligence 39, no. 11, 2298-2304, an end-to-end learnable method has been proposed based on CNN, bidirectional long- and short-term memory (BLSTM), and connectionist temporal classification (CTC) in order to recognize a scene text image. A problem with this method is that the independence of feature values of time steps of BLMST is postulated when the output label of a CTC layer is to be predicted. This problem is known as a hard alignment problem that reduces model accuracy.

Afterwards, in order to solve the above problem, a method based on an RNN encoder-decoder attention mechanism has been proposed as described in Kang, Lei, J. Ignacio Toledo, Pau Riba, Mauricio Villegas, Alicia Fornes, and Marcal Rusinol (2018), "Convolve, attend and spell: An attention-based sequence-to-sequence model for handwritten word recognition," In German Conference on Pattern Recognition, pp. 459-472, Springer, Cham. This method extracts features by using the CNN. The extracted features are encoded by the RNN. The attention mechanism adjusts the encoded features to match an output label. Next, from the first text line to the last text line, the RNN decoder learns to sequentially decode the encoded features to corresponding labels. The result of decoding in the preceding time step is additionally used for decoding in the succeeding time step. Therefore, this method works to solve the problem with the earlier-mentioned method based on CTC. However, the problem with this method lies in sequential learning, that is, lies in the fact that an error due to decoding propagates to the succeeding time step.

Recently, a method of self-attention without the use of the RNN has been proposed as described in Lee, Junyeop, Sungrae Park, Jeonghun Baek, Seong Joon Oh, Seonghyeon Kim, and Hwalsuk Lee, "On recognizing texts of arbitrary shapes with 2D self-attention," In Proceedings of the IEEE/CVF Conference on Computer Vision and Pattern Recognition Workshops, pp. 546-547, 2020. This method uses the CNN to extract the features. An encoder based on dot-production self-attention encodes CNN features. Next, a decoder based on dot-production self-attention learns to decode the encoded features to the output label. In a training stage, this learning process is performed in parallel with all characters of the output label. Therefore, this overcomes the problem with the method based on RNN encoder-decoder attention.

When an earlier-mentioned method based on deep learning is adopted, a model is generally formed by a CNN feature extractor (called as FEX) and a language context relation network (called as RN). The FEX downsamples an input image to reduce the calculation cost of the next layer, and extracts deep visual features of the text line image. The RN learns the relation between character patterns in the text line image. The above method achieves high accuracy in a case where learning data and test data are in the same style. However, the accuracy of the above method decreases when testing data in a new style. In order to generalize the above-mentioned model to data in various styles, many labeled data are required for achieving an acceptable recognition rate.

As described in Wang, Mei, and Weihong Deng (2018), "Deep visual domain adaptation: A survey," Neurocomputing 312: 135-153, a solution for saving the labeling cost of preparing the labeled data is to apply a transferable feature learning method, for instance, for dropout and batch normalization for constructing a model, diversify the learning data by using a data extension method, and apply a domain adaptation method. At present, the transferable feature learning method and the data extension method are often applied to a model based on deep learning. However, these methods are not sufficiently robust for documents in various styles. Recently, the domain adaptation method has produced promising results for recognizing the documents in various styles as described in Zhang, Yaping, Shuai Nie, Wenju Liu, Xing Xu, Dongxiang Zhang, and Heng Tao Shen, "Sequence-to-sequence domain adaptation network for robust text-image recognition," In Proceedings of the IEEE Conference on Computer Vision and Pattern Recognition, pp. 2740-2749, 2019. By using unlabeled data, this method causes a model to learn invariant features of text line images in various styles. One disadvantage of this method is that a large amount of unlabeled data is not always available. Therefore, it is demanded that the domain adaptation method be applied to a case where the number of samples is small.

SUMMARY OF THE INVENTION

A major problem with a text line recognition method based on deep learning is that overtraining occurs to decrease the accuracy of recognition of data in a different style from training data although the accuracy of recognition of data is high when the data of a model is the same as the training data. There are various types of text line data such as printed text, scene text, and handwritten text. In each type of text line data, a text line varies in handwriting style, font, and background. Further, the text line is rich in content. Therefore, a large amount of data is necessary for training the model for the purpose of achieving acceptable accuracy.

In view of the above circumstances, the present invention has been made to provide a technology for properly generating a text line recognition model that is able to fit a text line image in a desired style even when a limited number of data samples are available for training.

In order to provide the above technology, according to an aspect of the present invention, there is provided a model generation system for generating a text line recognition model that recognizes a text line included in a text line image. The model generation system includes a processor section. The text line recognition model includes a visual feature extractor and a language context relation network. When executed by the processor section, the visual feature extractor outputs image feature values from the text line image. When executed by the processor section, the language context relation network inputs the feature values outputted from the visual feature extractor, and outputs the text line. The processor section acquires text data for training, trains the language context relation network by using the acquired text data, and thus determines a variable of the language context relation network; determines a variable of the visual feature extractor by training the text line recognition model through the use of an existing labeled text line image while the variable of the language context relation network is fixed at the determined variable thereof; and generates the text line recognition model while the variable of the language context relation network is set to the determined variable thereof and the variable of the visual feature extractor is set to the determined variable thereof.

The technology provided by the present invention properly generates a text line recognition model that is able to fit a text line image in a desired style even when a limited number of data samples are available for training.

DESCRIPTION OF THE PREFERRED EMBODIMENTS

Embodiments of the present invention will now be described with reference to the accompanying drawings. It should be noted that the embodiments described below are not intended to limit the present invention defined in the appended claims. Further, all elements described in conjunction with the embodiments and their combinations are not necessarily essential to solutions provided by the present invention.

Deep learning with a neural network, such as a convolutional neural network (CNN) or a recurrent neural network (RNN), may not be described in detail below because it is understood by persons skilled in the art.

Further, the following description assumes that a "processor section" includes one or more processors. At least one processor is typically a microprocessor such as a central processing unit (CPU) or a graphics processing unit (GPU). Each of one or more processors may be a single-core processor or a multi-core processor. The processors may include a hardware circuit that performs a part or the whole of processing.

Figure 1:
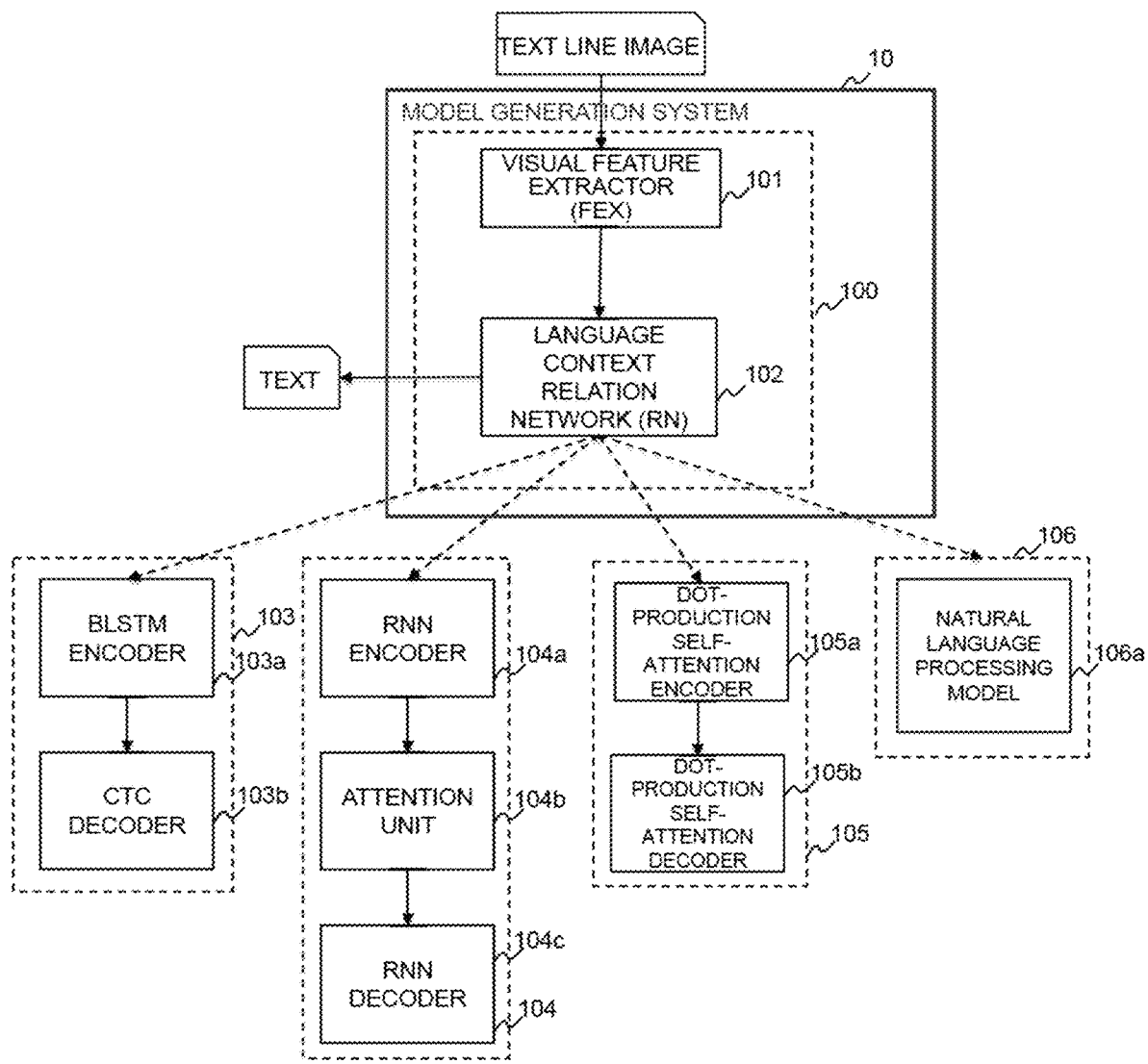
FIG. 1 is a diagram illustrating a text line recognition model that is to be generated in a model generation system according to an embodiment of the present invention.

FIG. 1 is a diagram illustrating a text line recognition model that is to be generated in a model generation system according to an embodiment of the present invention.

The model generation system 10 includes a text line recognition model 100. The text line recognition model 100 includes a visual feature extractor (FEX) 101 and a language context relation network (RN) 102.

The FEX 101 inputs a text line image, and outputs feature values in the text line image. The FEX 101 includes, for example, a shallow layer of the CNN, such as VGGNet or RestNet. Note that VGGNet and RestNet will not be described in detail because they are well-known technologies. The FEX 101 downsamples an input image, and thus reduces the calculation cost of subsequent processing.

The RN 102 inputs the feature values, and outputs text included in the text line image. The RN 102 includes, for example, an encoder for encoding the inputted feature values, and a decoder for inputting encoded data to restore individual characters. The RN 102 may include, for example, networks 103, 104, 105, and 106. The network 103 includes a BLSTM encoder 103a and a CTC decoder 103b. The network 104 includes an RNN encoder 104a for encoding the inputted feature values, an attention unit 104b for deducing some of the feature values that are to be given attention, and an RNN decoder 104c for inputting data deduced by the attention unit 104b to restore individual characters. The network 105 includes a dot-production self-attention encoder 105a and a dot-production self-attention decoder 105b. The network 106 includes a natural language processing model 106a.

An example hardware configuration of the model generation system 10 will now be described.

Figure 2:
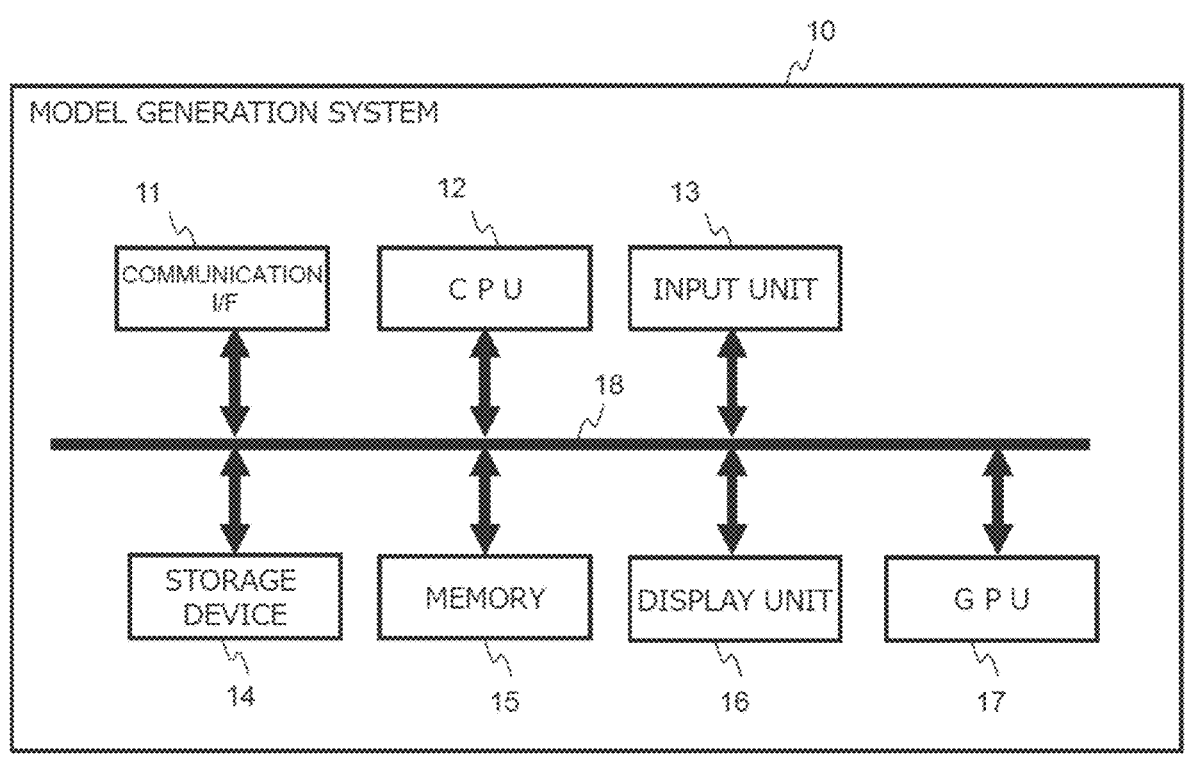
FIG. 2 is a diagram illustrating a hardware configuration of the model generation system according to an embodiment of the present invention.

FIG. 2 is a diagram illustrating a hardware configuration of the model generation system according to an embodiment of the present invention.

The model generation system 10, which is formed, for example, by a computer such as a personal computer (PC) or a general-purpose server, includes a communication interface (communication I/F) 11, a CPU 12, an input unit 13, a storage device 14, a memory 15, a display unit 16, a GPU 17, and a bus 18. The communication I/F 11, the CPU 12, the input unit 13, the storage device 14, the memory 15, the display unit 16, and the GPU 17 are connected with each other through the bus 18. It should be noted that the model generation system 10 may be formed by a plurality of computers.

The communication I/F 11 is connected to an undepicted network such as the Internet, and configured to transmit and receive data to and from other equipment connected to the network. The CPU 12 executes various processing by executing a program stored in the memory 15. In the present embodiment, the CPU 12 executes a process of executing the text line recognition model 100, but causes the GPU 17 to execute some processing.

The storage device 14 is a non-transitory storage device (non-volatile storage device) such as a hard disk drive (HDD) or a solid-state drive (SSD), and configured to store various information and the program to be executed by the CPU 12. The memory 15 is, for example, a random-access memory (RAM), and configured to store various information and the program to be executed by the CPU 12.

The GPU 17 is, for example, a processor suitable for executing specific processing such as image processing or neural network model execution processing, or more specifically, suitable for executing parallel processing. In the present embodiment, the GPU 17 executes predetermined processing in accordance with an instruction from the CPU 12. The input unit 13 is, for example, a mouse or a keyboard, and configured to receive various inputs from an operator. The display unit 16 is, for example, a display, and configured to generate an output for displaying a screen containing various information through a graphical user interface (GUI).

The following describes a method of generalizing the text line recognition model for recognizing text line images in different styles. Firstly, a lemma for generalizing the text line recognition model is presented below.

Lemma: $\phi_e$ and $\phi_r$ are respectively regarded as the weights of FEX and RN of the text line recognition model. In a case where the FEX can be generalized with respect to text images $I \in R^{(w \times h \times c)}$ in various styles (R indicates an image set, W indicates an image width, h indicates an image height, and c indicates an image channel (e.g., RGB)) and when the RN is trained by a large amount of text, a prototype model f for $\phi_e$, and $\phi_r$ is generalized.

The following describes a process that is performed by the model generation system 10 in order to generate a generalized text line recognition model and fine-tune the text line recognition model in accordance with new emerging data.

Step 1: The model generation system 10 acquires a large amount of copyright-free text from a published Internet website through the Internet, and uses the acquired copyright-free text to train the RN 102. Step 1 will be described in detail later with reference to FIGS. 3 to 5.

Step 2: While the weight (variable) of the RN 102, which is acquired through training in step 1, is frozen (fixed), the model generation system 10 generalizes the FEX 101 with respect to text line images in various styles by training the text line recognition model 100 through the use of an existing labeled text line image. That is to say, the model generation system 10 adjusts the variable of the FEX 101. Step 2 will be described in detail later with reference to FIGS. 6 and 7.

Step 3: The model generation system 10 fine-tunes the text line recognition model 100 by training the text line recognition model 100 trained in steps 1 and 2 through the use of data of some labeled text line images (referred to as the bootstrap data), which are to be used as samples in a desired style to be recognized, that is, fine-tunes the variable of the text line recognition model 100. The fine-tuned text line recognition model 100 described above achieves high recognition accuracy in text recognition of a text line image including the style to be recognized. Step 3 will be described in detail later with reference to FIGS. 8 and 9.

Processing for training the RN 102 (step 1) will now be described with reference to FIGS. 3 to 5.

Figure 3:
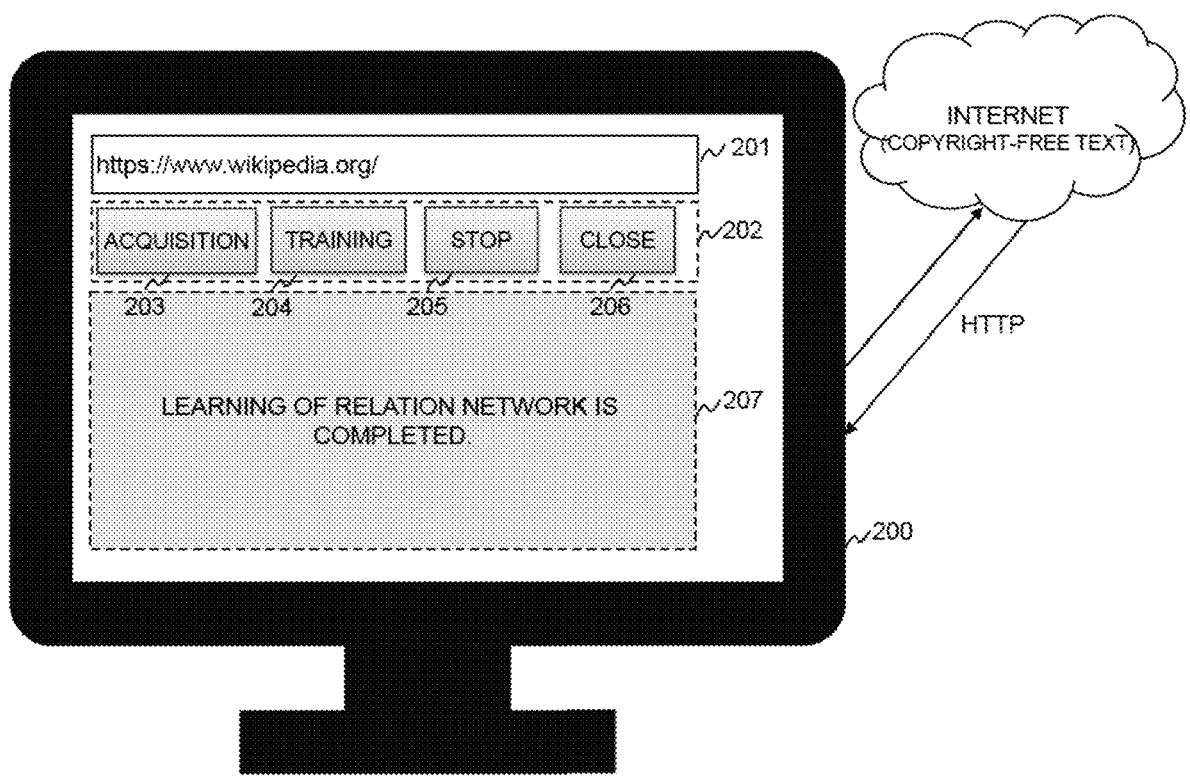
FIG. 3 is a diagram illustrating an example screen of a GUI associated with a training process of training a language context relation network (RN) according to an embodiment of the present invention.

FIG. 3 is a diagram illustrating an example screen of the GUI associated with a training process of training the RN according to an embodiment of the present invention.

The screen 200 of the GUI associated with the process of training the RN 102 includes a text box 201, an operation panel 202, and a status display window 207.

The text box 201 is a region that is used to input a link to a resource of text to be acquired from the Internet. The link is, for example, a link to a copyright-free resource or a link to a resource authorized by the operator.

The status display window 207 is a region where information about various statuses is displayed.

The operation panel 202 includes an acquisition button 203, a training button 204, a stop button 205, and a close button 206.

When the acquisition button 203 is pressed (clicked) by the operator, the model generation system 10 executes a text acquisition process of acquiring text data from the linked resource inputted into the text box 201 through the Internet. Upon completion of this process, the model generation system 10 displays a completion message in the status display window 207. Subsequently, by pressing the training button 204, the operator is able to train the RN 102 based on the acquired text data.

Figure 4:
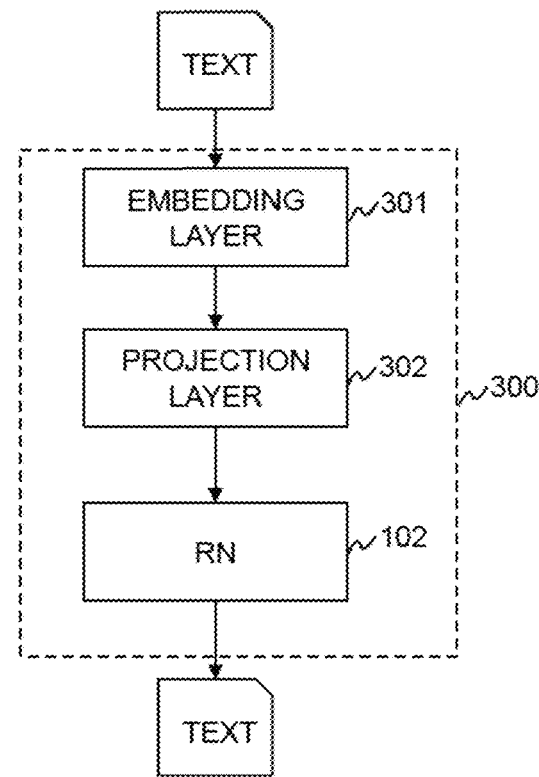
FIG. 4 is a diagram illustrating a first example of the training process of training the RN according to an embodiment of the present invention.
Figure 5:
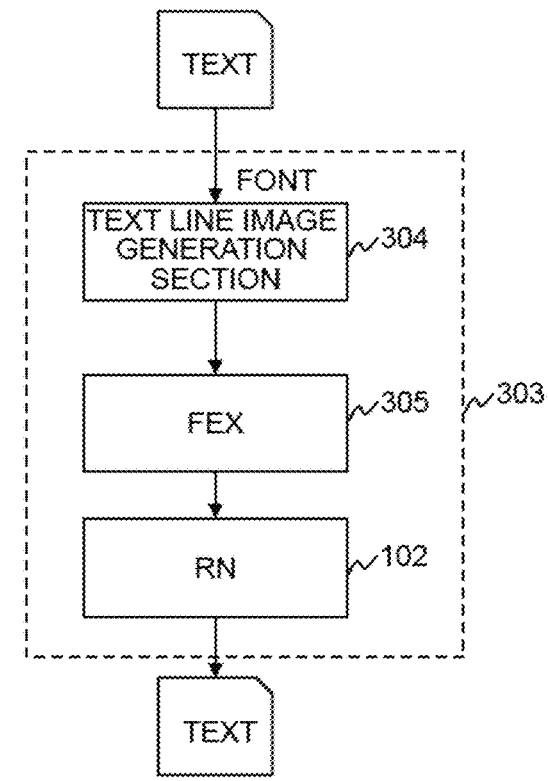
FIG. 5 is a diagram illustrating a second example of the training process of training the RN according to an embodiment of the present invention.

When the operator presses the training button 204, the model generation system 10 executes the training process of training the RN 102 based on the acquired text data (see FIGS. 4 and 5). The model generation system 10 displays the execution state of the training process in the status display window 207.

When the operator presses the stop button 205 after the start of the training process for the RN 102, the model generation system 10 stops the training process, and causes the storage device 14 to store the weight (variable) of the RN 102 at the time of stoppage of the training process. Subsequently, when the operator presses the training button 204, the model generation system 10 reloads, into the memory 15, the RN 102 in a state at the time of stoppage of the training process, and resumes processing subsequent to the time of stoppage of the training process.

When the operator presses the close button 206 after the end of the training process, the model generation system 10 stores the variable of the trained RN 102 in the storage device 14.

A first example of the training process performed by the model generation system 10 to train the RN 102 will now be described.

FIG. 4 is a diagram illustrating the first example of the training process of training the RN according to an embodiment of the present invention.

In the first example of the training process 300, the model generation system 10 inputs the acquired text data into an embedding layer 301. The model generation system 10 uses the embedding layer 301 to convert text to convolutional features by performing an embedding process of converting text to numerical values and performing a convolution process on the resulting numerical values. By using a projection layer 302, the model generation system 10 performs linear convolution of the convolutional features and adjusts the size of data. The model generation system 10 trains the RN 102 by using data outputted from the projection layer 302.

A second example of the training process performed by the model generation system 10 to train the RN 102 will now be described.

FIG. 5 is a diagram illustrating the second example of the training process of training the RN according to an embodiment of the present invention.

In the second example of the training process 303, the model generation system 10 inputs the acquired text data into a text line image generation section 304. The text line image generation section 304 converts the text data to a text line image by using a predetermined available digital font (e.g., Arial or MS Gothic). The model generation system 10 uses an FEX 305 to extract the feature values of the text line image. The FEX 305 may have the same structure as the FEX 101. However, the variable set in the FEX 305 may differ from the variable set in the FEX 101. The variable of the FEX 305 may be predetermined by training. The model generation system 10 trains the RN 102 by using features outputted from the FEX 305.

A generation process of generating a generalized prototype model of the text line recognition model will now be described.

In the present embodiment, the model generation system 10 generates the text line recognition model 100, which serves as a training target for prototype model generation, by combining the RN 102, which is trained by the above-described training process, and the FEX 101, which is not trained, and then performs training by using an existing labeled text line image (training text line data) while the weight (variable) of the RN 102 is frozen (fixed) in the text line recognition model 100. In this instance, the training text line data is classified into domains (an example of a style-specific image group) of individual text line images of the same style for management purposes. For example, text line images created by the same writer are classified into the same domain. Further, for example, printed text line images, such as the images of a scene text, a bank form, a bill, or a receipt, are classified into the same domain as long as they are created by using the same font or a similar background or texture.

Figure 6:
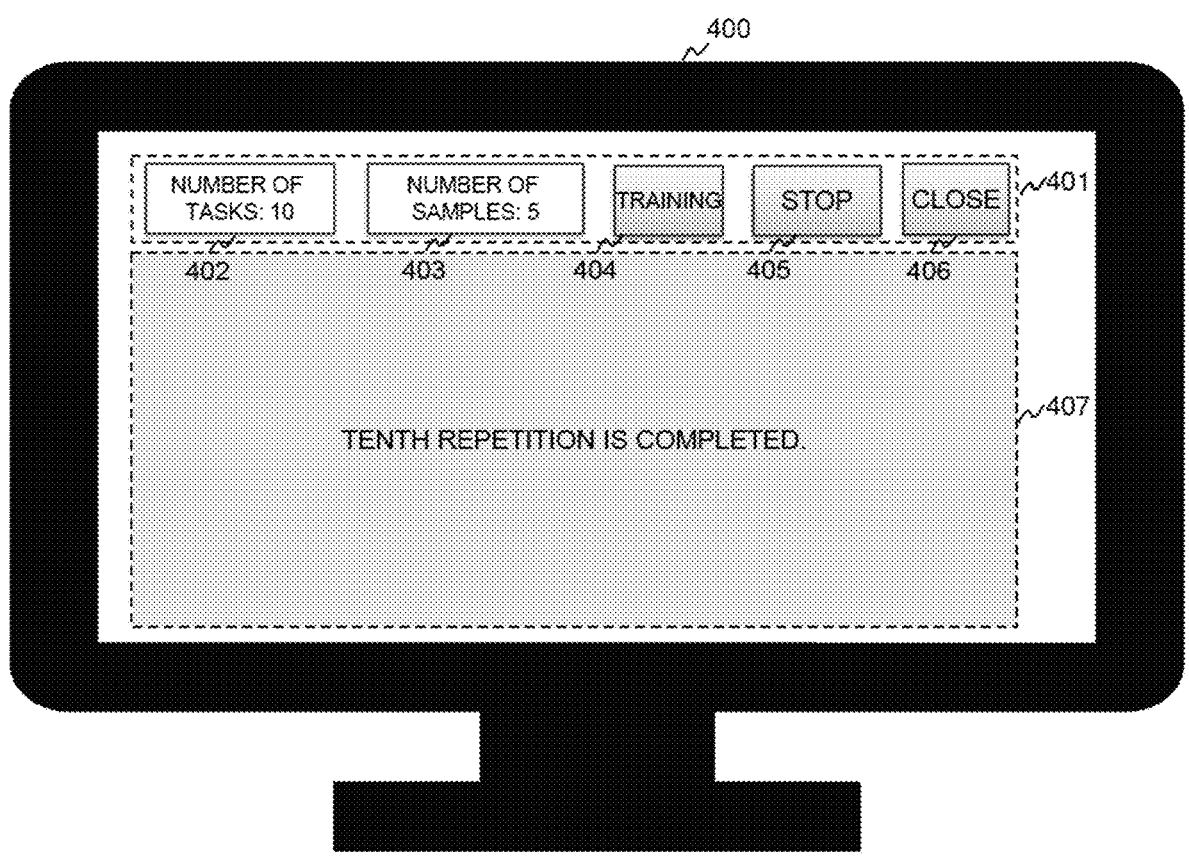
FIG. 6 is a diagram illustrating an example screen of a GUI associated with a process of generating a prototype model according to an embodiment of the present invention.

FIG. 6 is a diagram illustrating an example screen of a GUI associated with a process of generating a prototype model according to an embodiment of the present invention.

The screen 400 of the GUI associated with prototype model generation includes an operation panel 401 and a training state display window 407.

The training state display window 407 is a region where information about a training state is displayed.

The operation panel 401 includes an input box 402, an input box 403, a training button 404, a stop button 405, and a close button 406.

The input box 402 is a region where the operator inputs the number of tasks (t), which indicates the number of domains used for training. The input box 403 is a region where the operator inputs the number of samples of the training text line data that are used for training with respect to each domain.

When the training button 404 is pressed by the operator, the model generation system 10 executes a prototype model generation process (see FIG. 7) of generating prototype data by training the text line recognition model 100 to be trained. The model generation system 10 causes the training state display window 407 to display a training state in the prototype model generation process.

When the operator presses the stop button 405 after the start of the prototype model generation process, the model generation system 10 stops the prototype model generation process, and causes the storage device 14 to store the weight (variable) of the text line recognition model 100 at the time of stoppage of the prototype model generation process. Subsequently, when the operator presses the training button 404, the model generation system 10 reloads, into the memory 15, the text line recognition model 100 in a state at the time of stoppage of the prototype model generation process, and resumes processing subsequent to the time of stoppage of the prototype model generation process.

When the operator presses the close button 406 after the end of the prototype model generation process, the model generation system 10 stores the variable of the trained text line recognition model 100 in the storage device 14.

The prototype model generation process performed by the model generation system 10 to generate a prototype model will now be described.

Figure 7:
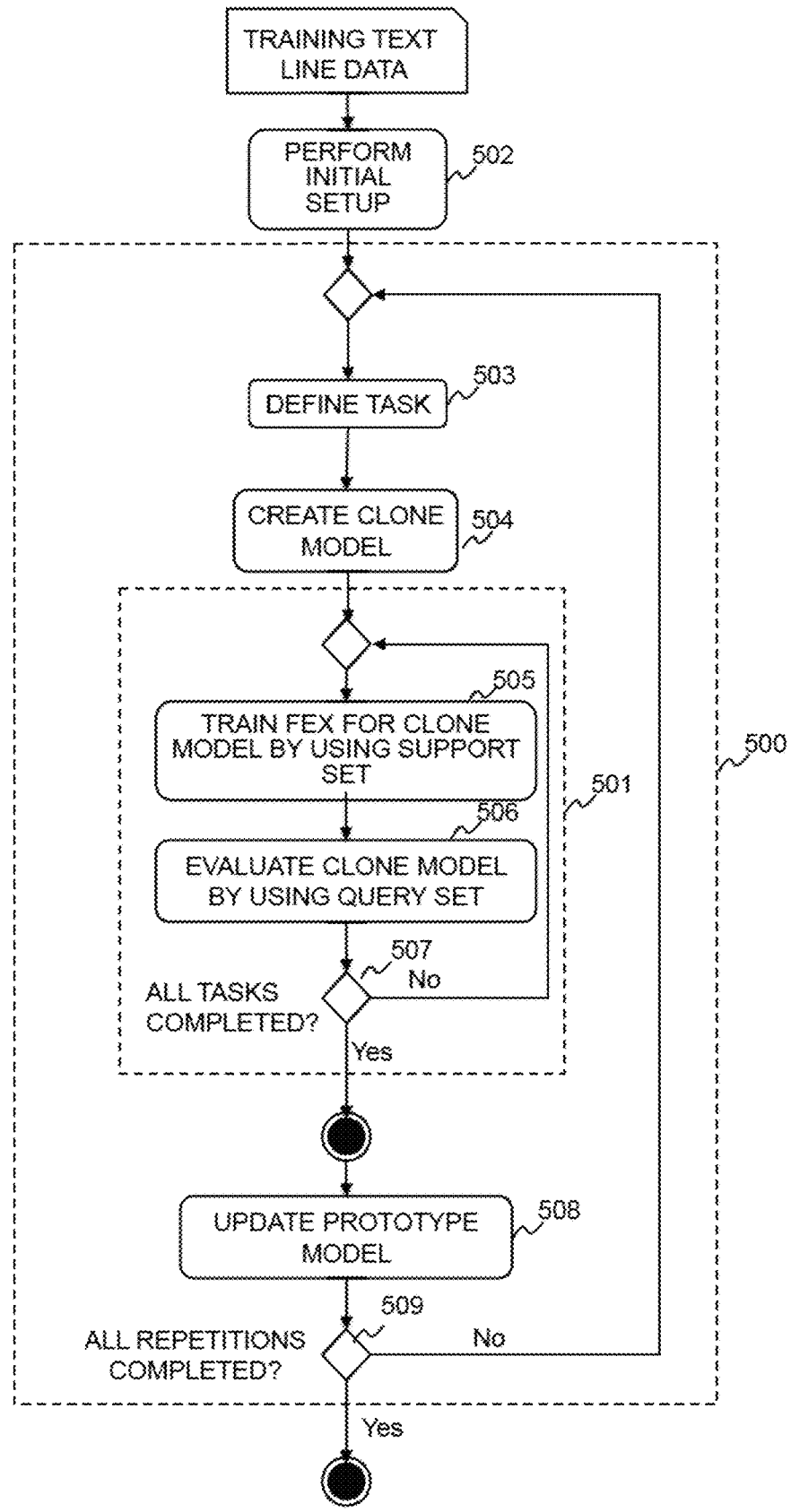
FIG. 7 is a flowchart illustrating the process of generating the prototype model according to an embodiment of the present invention.

FIG. 7 is a flowchart illustrating the prototype model generation process according to an embodiment of the present invention.

In the following description, it is assumed that the weight of the prototype model of the text line recognition model 100 is (1), and that the weight of a model (clone model) created as a clone of the prototype model is $\phi'$.

The model generation system 10 initializes an internal training rate $\alpha$, a meta training rate $\beta$, and the weight of the FEX 101 for the text line recognition model 100 to be trained (step 502). The weight of the RN 102 for the text line recognition model 100 to be trained is copied from the RN 102 trained in the training process and frozen in the prototype model generation process.

Next, the model generation system 10 executes an iterative process 500 to generate (train) the prototype model.

In the iterative process 500, the model generation system 10 first defines a task (step 503). More specifically, the model generation system 10 randomly selects t domains (t is a value inputted to the input box 402) from n domains $D=\{D_1, D_2, \ldots, D_n\}$ of the training text line data. Here, $t \ll n$. Next, the model generation system 10 randomly extracts two sets $T_i = \{D_i^{sp}, D_i^{qr}\}$ in the selected domains i. Here, $T_i$ denotes data of the ith domain, $D_i^{sp}$ is referred to as the support set and used as the set for training, and $D_i^{qr}$ is referred to as the query set and used as the set for model evaluation. Each set includes s samples (s is a value inputted to the input box 403).

Next, the model generation system 10 creates a clone model of the prototype model (step 504).

Next, the model generation system 10 repeatedly executes a process 501 for each task that uses the data of each domain.

As for a task $TA_i$, the model generation system 10 trains the FEX 101 for the clone model by using the support set $D_i^{sp} = \{I_i^{sp}, L_i^{sp}\}$ (step 505). Here, $I_i^{sp}$ is a text line image of the support set, and $L_i^{sp}$ is a label corresponding to the text line image of the support set.

In the training in step 505, the weight ϕ' of the clone model is updated as indicated in Equation 1.

[Equation 1]

$$\phi' = \phi' - \alpha \nabla L(\widetilde{f_i^{sp}}, L_i^{sp})) \quad (1)$$

In Equation 1 above, L is the loss function of model output and input label, ∇ is the gradient of the loss function, and $\widetilde{f_i^{sp}}$ is an output of the clone model that inputs $I_i^{sp}$.

Next, as for the task $TA_i$, the model generation system 10 evaluates the FEX 101 for the clone model by using a query set $D_i^{qr} = \{I_i^{qr}, L_i^{qr}\}$ (step 506). Here, $I_i^{qr}$ is a text line image of the query set, and $L_i^{qr}$ is a label corresponding to the text line image of the query set.

In the evaluation in step 506, a total valuation loss $L_{it}$ is updated as indicated in Equation 2.

[Equation 2]

$$L_{it} = L_{it} + L(\widetilde{f_i^{qr}}, L_i^{qr}) \quad (2)$$

Here, $\widetilde{f_i^{qr}}$ is an output of the clone model that inputs $I_i^{qr}$.

Next, the model generation system 10 determines whether all the tasks are completed (step 507). If all the tasks are not completed ("NO" at step 507), the processing proceeds to step 505 so as to process another task.

Meanwhile, if all the tasks are completed, that is, clone model training and evaluation are completed for all the tasks ("YES" at step 507), the model generation system 10 updates the weight of the prototype model by using the total valuation loss as indicated in Equation 3 (step 508).

[Equation 3]

$$\phi = \phi - \beta \nabla L_{it} \quad (3)$$

Next, the model generation system 10 determines whether the iterative process 500 has been executed a predetermined number of times (step 509). If the iterative process 500 has not been executed the predetermined number of times ("NO" at step 509), the processing proceeds to step 503 so as to further execute the iterative process 500. Consequently, in each repetition of the iterative process 500, the prototype model is trained so as to increase the accuracy of query set recognition by using the support set. A sufficient increase in the number of repetitions of the iterative process enables the prototype model to acquire generalized characteristics and achieve high recognition accuracy through the use of a limited number of training samples.

Meanwhile, if the iterative process 500 has been executed the predetermined number of times ("YES" at step 509), the model generation system 10 terminates the prototype model generation process.

A retraining process of retraining the text line recognition model will now be described.

Figure 8:
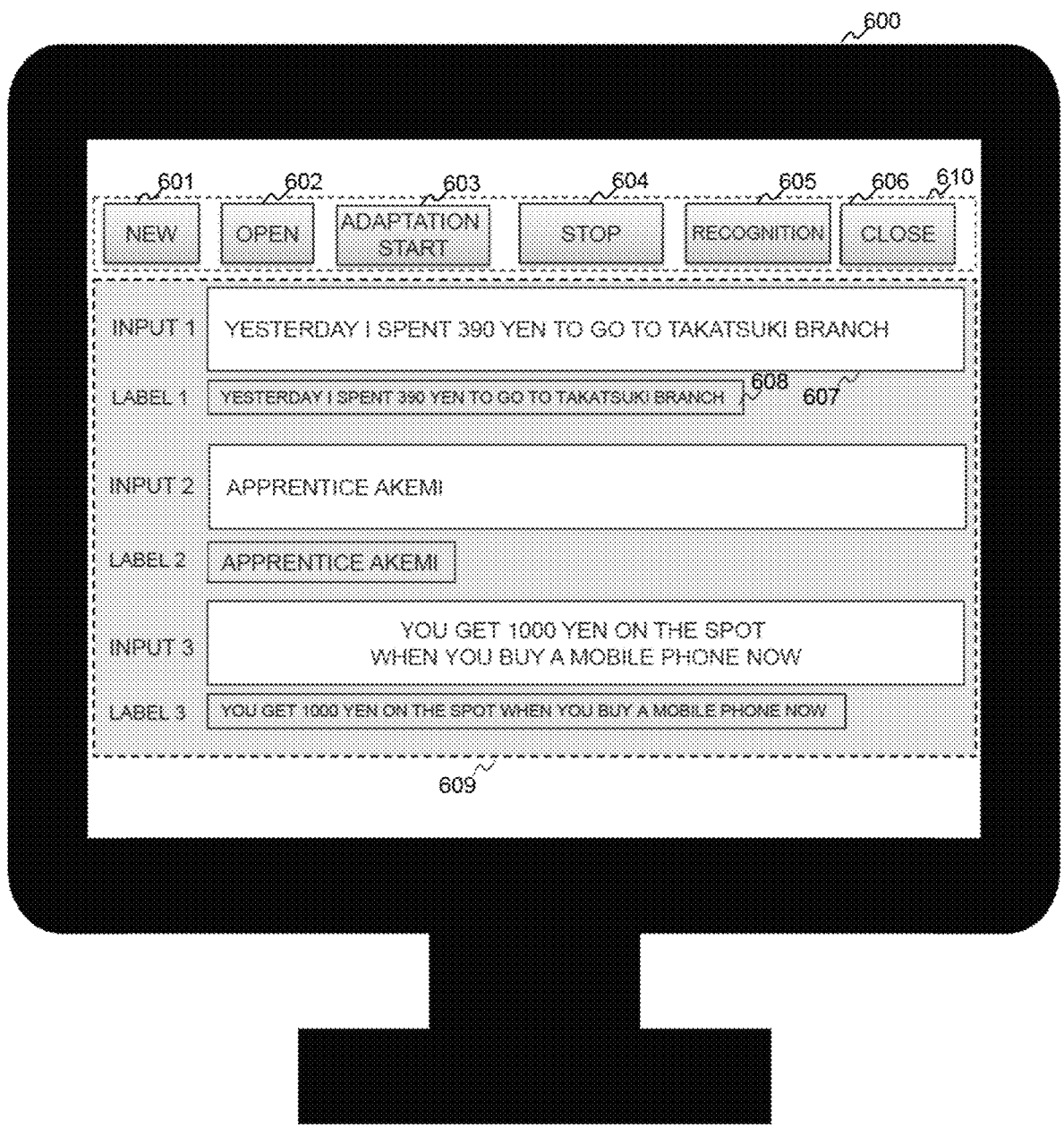
FIG. 8 is a diagram illustrating an example screen of a GUI associated with a retraining process of retraining the text line recognition model according to an embodiment of the present invention.

FIG. 8 is a diagram illustrating an example screen of a GUI associated with the retraining process of retraining the text line recognition model according to an embodiment of the present invention.

The screen 600 of the GUI for retraining the text line recognition model includes an operation panel 610 and a window 609.

The operation panel 610 includes a new button 601, an open button 602, an adaptation start button 603, a stop button 604, a recognition button 605, and a close button 606.

When the new button 601 is pressed, the model generation system 10 causes the window 609 to display a predetermined number of input regions 607 (e.g., S input regions 607) where text lines can be handwritten and display S text boxes 608 where labels corresponding to the text lines inputted to the input regions 607 can be inputted by the operator. Here, "S" may be a number less than 5.

Further, when the open button 602 is pressed, the model generation system 10 displays an undepicted window for allowing the operator to access the storage device 14 and select S text line images to be used, then causes the window 609 to display the S text line images selected by the operator, and displays the S text boxes 608 where the labels corresponding to the displayed text line images can be inputted by the operator.

When the operator presses the adaptation start button 603, the model generation system 10 starts the retraining process (see FIG. 9) of fine-tuning the prototype model by using S input samples (sets of text line images and labels corresponding to the text line images) inputted to the window 609.

When the operator presses the stop button 604 after the start of the retraining process, the model generation system 10 stops the retraining process, and causes the storage device 14 to store the weight (variable) of the prototype model at the time of stoppage of the retraining process. Subsequently, when the operator presses the adaptation start button 603, the model generation system 10 reloads, into the memory 15, the prototype model 0 in a state at the time of stoppage of the retraining process, and resumes processing subsequent to the time of stoppage of the retraining process.

Further, when the operator presses the recognition button 605 after the input of a handwritten or selected text line image, the model generation system 10 performs text recognition on the inputted text line image by using the then-current prototype model, and displays the result of text recognition in the window 609. This enables the operator to test the text recognition on the retrained prototype model.

When the operator presses the close button 606 after the end of the retraining process, the model generation system 10 causes the storage device 14 to store the variable of the prototype model that has been subjected to the retraining process. Text recognition subsequently performed on a text line image uses the text line recognition model 100 where the above stored variable is set.

The retraining process performed on the text line recognition model by the model generation system 10 will now be described.

Figure 9:
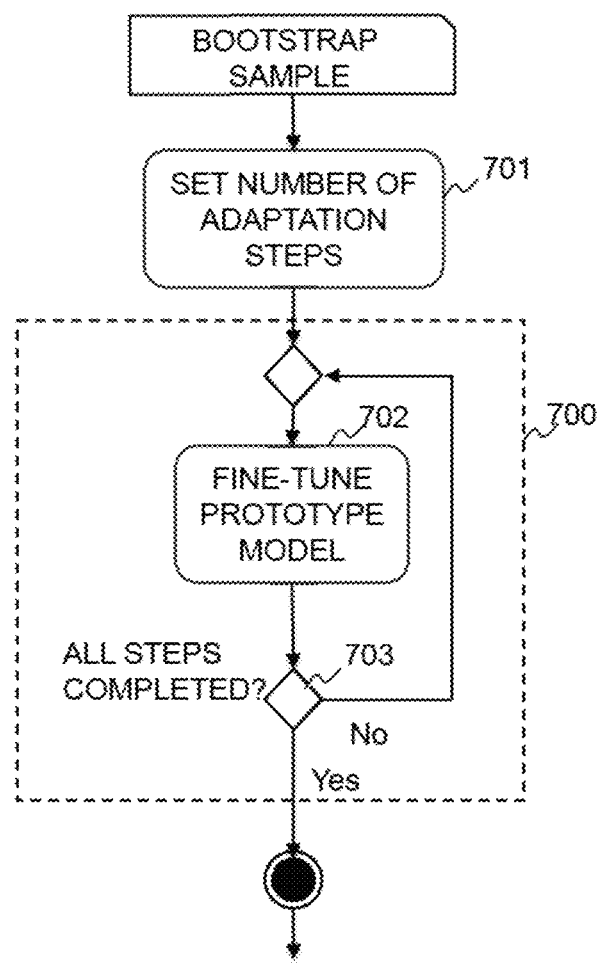
FIG. 9 is a flowchart illustrating the retraining process of retraining the text line recognition model according to an embodiment of the present invention.

FIG. 9 is a flowchart illustrating the retraining process that is performed on the text line recognition model according to an embodiment of the present invention.

The model generation system 10 sets the number of adaptation steps 700 (adaptation step count) to be executed (step 701). The adaptation step count may be any number. Next, the model generation system 10 retrains (fine-tunes) the prototype model by using the inputted input samples (step 702).

Next, the model generation system 10 determines whether the execution of all the adaptation steps is completed (step 703). If the execution of all the adaptation steps is not completed ("NO" at step 703), the model generation system 10 executes the next adaptation step 700. Meanwhile, if the execution of all the adaptation steps is completed ("YES" at step 703), the model generation system 10 causes the window 609 to indicate the completion of adaptation, and terminates the retraining process.

It should be noted that the present invention is not limited to the foregoing embodiments, but extends to various modifications that nevertheless fall within the spirit and scope of the appended claims.

For example, the processing performed by the processors in the foregoing embodiments may be partly or wholly performed by a hardware circuit. Further, the program in the foregoing embodiments may be installed from a program source. The program source may be a program distribution server or a storage medium (e.g., a portable storage medium).

What is claimed is:

1. A model generation system for generating a text line recognition model that recognizes a text line included in a text line image, the model generation system comprising:
   a memory; and
   a processor section, wherein
   the text line recognition model includes
      a visual feature extractor that, when executed by the processor section, outputs image feature values from the text line image, and
      a language context relation network that, when executed by the processor section, inputs the feature values outputted from the visual feature extractor, and outputs the text line,
   the processor section by executing a program stored in the memory that performs the following steps:
      (1) determining a variable of the language context relation network by acquiring text data for training and thus training the language context relation network by using the acquired text data,
      (2) determining a variable of the visual feature extractor by training the text line recognition model through use of an existing labeled text line image while the variable of the language context relation network is set according to step (1), and
      (3) generating the text line recognition model while the variable of the language context relation network is set according to step (1) and the variable of the visual feature extractor is set according to step (2),
      wherein the memory is configured to store the text line recognition model.

2. The model generation system according to claim 1, wherein
   the processor section adjusts the variable of the text line recognition model by training the text line recognition model through use of labeled text line images smaller in number than a predetermined number.

3. The model generation system according to claim 1, wherein
   the model generation system is connected to the Internet, and
   the processor section accesses the Internet to acquire the text data for the training.

4. The model generation system according to claim 3, wherein
   the text data for the training is formed by copyright-free text data published on the Internet.

5. The model generation system according to claim 2, wherein
   the processor section by executing a program stored in the memory that:
      receives a text line image and a label to be attached to the text line image that are inputted by a user, and
      adjusts a variable of the text line recognition model by training the text line recognition model through use of the received text line image and label.

6. The model generation system according to claim 1, wherein
   the processor section trains the language context relation network by acquiring text line data for the training, performing word embedding for quantifying the acquired text line data, convolving the quantified data, and inputting the resulting data to the language context relation network.

7. The model generation system according to claim 1, wherein
   the processor section trains the language context relation network by acquiring the text line data for the training, converting the acquired text line data to a text line image through use of a predetermined font, inputting the resulting text line image to a predetermined visual feature extractor, and inputting the output of the predetermined visual feature extractor to the language context relation network.

8. The model generation system according to claim 1, wherein
   the existing labeled text line image is managed via the processor by a plurality of style-specific image groups formed by text line images of a same style, and
   the processor section determines the variable of the visual feature extractor by training the text line recognition model through use of the labeled text line image in each of the style-specific image groups while the variable of the language context relation network is fixed at the determined variable.

9. A model generation method adopted by a model generation system for generating a text line recognition model that recognizes a text line included in a text line image,
   the text line recognition model including
      a visual feature extractor that, when executed by the model generation system, outputs image feature values from the text line image, and
      a language context relation network that, when executed by the model generation system, inputs the feature values outputted from the visual feature extractor, and outputs the text line,
   the model generation method comprising:
   by the model generation system, the method including the following steps:
      (1) determining a variable of the language context relation network by acquiring text data for training and thus training the language context relation network by using the acquired text data;
      (2) determining a variable of the visual feature extractor by training the text line recognition model through use of an existing labeled text line image while the variable of the language context relation network is set according to step (1); and
      (3) generating the text line recognition model while the variable of the language context relation network is set according to step (1) and the variable of the visual feature extractor is set according to step (2).

* * * * *